US008066851B2

(12) United States Patent
Kapila et al.

(10) Patent No.: US 8,066,851 B2
(45) Date of Patent: Nov. 29, 2011

(54) IN-LINE TREATMENT OF HYDROCARBON FLUIDS WITH OZONE (75) Inventors: Mukesh Kapila, The Woodlands, TX (US); Ivan Batinic, Houston, TX (US); Paul Gover, Katy, TX (US); Neale Browne, Houston, TX (US)

(73) Assignee: M-I L.L.C., Houston, TX (US)

( * ) Notice: Subject to any disclaimer, the term of this patent is extended or adjusted under 35 U.S.C. 154(b) by 1071 days.

(21) Appl. No.: 11/877,485

(22) Filed: Oct. 23, 2007

(65) Prior Publication Data
US 2008/0277164 A1 Nov. 13, 2008

Related U.S. Application Data (60) Provisional application No. 60/916,698, filed on May 8, 2007.

(51) Int. Cl.
B01D 1/00 (2006.01)
B01D 3/00 (2006.01)

(52) U.S. Cl. .......... 196/98; 422/610; 422/615; 422/616; 202/185.1

(58) Field of Classification Search .................... 196/98; 422/186.11, 610, 614, 615, 616, 305; 202/185.1, 202/182; 175/66; 210/150, 151, 167.07, 210/416.5
See application file for complete search history.

(56) References Cited

U.S. PATENT DOCUMENTS

| 3,551,328 A | 12/1970 | Cole et al. |
| 3,945,918 A | 3/1976 | Kirk |
| 4,104,129 A | 8/1978 | Fields et al. |
| 4,314,902 A | 2/1982 | Bouk et al. |
| 5,127,343 A | 7/1992 | O'Ham |
| 5,344,313 A * | 9/1994 | Johnsen, Jr. .................. 431/346 |
| 5,463,176 A | 10/1995 | Eckert |
| 5,570,749 A * | 11/1996 | Reed .............................. 175/66 |
| 5,882,524 A * | 3/1999 | Storey et al. .................. 210/712 |
| 5,968,370 A * | 10/1999 | Trim ............................. 210/723 |
| 6,212,883 B1 * | 4/2001 | Kang ............................. 60/275 |

(Continued)

FOREIGN PATENT DOCUMENTS

DE 4016899 A1 12/1991

(Continued)

OTHER PUBLICATIONS

U.S. Office Action issued in related U.S. Appl. No. 11/114,929 dated Apr. 1, 2010. (14 pages).

(Continued)

Primary Examiner — Nina Bhat
(74) Attorney, Agent, or Firm — Osha • Liang LLP (57) ABSTRACT A system for treating recovered fluids in-line that includes a thermal reactor for separating contaminated drill cuttings into drill cuttings and contaminants by applying heat to the contaminated drill cuttings so as to vaporize contaminants from the contaminated drill cuttings; a first condenser in fluid connection with the thermal reactor for condensing the vaporized contaminants; a separator in fluid connection with the first condenser for separating the condensed vapors into an oleaginous liquid and an aqueous liquid, wherein at least a portion of one of the aqueous liquid and oleaginous liquid is fed back into the first condenser via a feedback line; and an ozone generator operatively coupled to the feedback line, wherein at least the portion of the fed back liquid is ozonated by the ozone generator and fed into the condenser is disclosed.

11 Claims, 4 Drawing Sheets

U.S. PATENT DOCUMENTS

| | | | |
|---|---|---|---|
| 6,399,851 B1 | 6/2002 | Siddle | |
| 6,658,757 B2 | 12/2003 | Fout et al. | |
| 6,711,830 B2 * | 3/2004 | Hensley et al. | 34/357 |
| 7,514,049 B2 * | 4/2009 | Kapila et al. | 422/307 |
| 7,867,376 B2 * | 1/2011 | Browne et al. | 208/3 |
| 2004/0204308 A1 | 10/2004 | Kapila et al. | |
| 2005/0010069 A1 * | 1/2005 | Fitchett et al. | 568/959 |
| 2005/0247599 A1 | 11/2005 | Browne et al. | |
| 2006/0163117 A1 | 7/2006 | Hong | |

FOREIGN PATENT DOCUMENTS

| | | |
|---|---|---|
| GB | 367848 A | 2/1932 |
| WO | 0129153 A1 | 4/2001 |
| WO | 2005104769 A2 | 11/2005 |

OTHER PUBLICATIONS

U. S. Office Action issued in U.S. Appl. No. 11/877,494 dated May 1, 2009 (9 pages).

Office Action issued in Canadian Application No. 2,564,459 dated Jul. 28, 2010 (1 page).

U.S. Office Action issued in U.S. Appl. No. 11/877,494 dated Aug. 4, 2010 (22 pages).

Notice of Allowance issued in U.S. Appl. No. 11/114,929 dated Jul. 26, 2010 (10 pages).

Notice of Allowance issued in U.S. Appl. No. 11/114,929 dated Aug. 24, 2010 (11 pages).

U. S. Office Action issued in U.S. Appl. No. 11/114,929 dated Sep. 24, 2009 (10 pages).

esp@cenet Patent Abstract for German Publication No. DE4016899, publication date Dec. 19, 1991. (1 page).

PCT International Search Report issued in PCT Application No. PCT/US2008/060236 dated Apr. 14, 2008 (3 pages).

PCT Written Opinion issued in PCT Application No. PCT/US2008/060236 dated Apr. 14, 2008 (4 pages).

Supplemental European Search Report for European Application No. 05742095.2-2104, mailed on Oct. 2, 2009 (3 pages).

Mei et al.; "A new method for obtaining ultra-low sulfur diesel fuel via ultrasound assisted oxidative desulfurization", Fuel, vol. 82, Oct. 22-Sep. 22, 2002, pp. 405-414, XP002550500; www.fuelfirst.com (10 pages).

Office Action issued in Mexican Application No. MX/a/2009/011978 dated Nov. 30, 2010 (6 pages).

Office Action issued in corresponding Canadian Patent Application No. 2,680,585; Dated Feb. 23, 2011 (2 pages).

Office Action issued in related U.S. Appl. No. 11/877,494 dated Jan. 27, 2011 (29 pages).

Office Action issued in corresponding Canadian Appplication No. 2,686,404 dated Jan. 31, 2011 (2 pages).

* cited by examiner

IN-LINE TREATMENT OF HYDROCARBON FLUIDS WITH OZONE

CROSS-REFERENCE TO RELATED APPLICATIONS

This application claims priority under 35 U.S.C. §119(e) to U.S. Provisional Application No. 60/916,698, filed on May 8, 2007, which is herein incorporated by reference in its entirety.

BACKGROUND OF INVENTION

1. Field of the Invention

Embodiments disclosed herein generally relate to a system for treating recovered fluids. More specifically, embodiments disclosed herein generally relate to an in-line system and method for treating recovered hydrocarbons and/or aqueous fluids with ozone.

2. Background Art

When drilling or completing wells in earth formations, various fluids typically are used in the well for a variety of reasons. For purposes of description of the background of the invention and of the invention itself, such fluids will be referred to as "well fluids." Common uses for well fluids include: lubrication and cooling of drill bit cutting surfaces while drilling generally or drilling-in (i.e., drilling in a targeted petroleum bearing formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well displacing the fluid within the well with another fluid, cleaning the well, testing the well, implacing a packer fluid, abandoning the well or preparing the well for abandonment, and otherwise treating the well or the formation.

As stated above, one use of well fluids is the removal of rock particles ("cuttings") from the formation being drilled. A problem arises in disposing these cuttings, particularly when the drilling fluid is oil-based or hydrocarbon-based. That is, the oil from the drilling fluid (as well as any oil from the formation) becomes associated with or adsorbed to the surfaces of the cuttings. The cuttings are then an environmentally hazardous material, making disposal a problem.

A variety of methods have been proposed to remove adsorbed hydrocarbons from the cuttings. U.S. Pat. No. 5,968,370 discloses one such method which includes applying a treatment fluid to the contaminated cuttings. The treatment fluid includes water, a silicate, a nonionic surfactant, an anionic surfactant, a phosphate builder and a caustic compound. The treatment fluid is then contacted with, and preferably mixed thoroughly with, the contaminated cuttings for a time sufficient to remove the hydrocarbons from at least some of the solid particles. The treatment fluid causes the hydrocarbons to be desorbed and otherwise disassociated from the solid particles.

Furthermore, the hydrocarbons then form a separate homogeneous layer from the treatment fluid and any aqueous component. The hydrocarbons are then separated from the treatment fluid and from the solid particles in a separation step, e.g., by skimming. The hydrocarbons are then recovered, and the treatment fluid is recycled by applying the treatment fluid to additional contaminated sludge. The solvent must be processed separately.

Some prior art systems use low-temperature thermal desorption as a means for removing hydrocarbons from extracted soils. Generally speaking, low-temperature thermal desorption (LTTD) is an ex-situ remedial technology that uses heat to physically separate hydrocarbons from excavated soils. Thermal desorbers are designed to heat soils to temperatures sufficient to cause hydrocarbons to volatilize and desorb (physically separate) from the soil. Typically, in prior art systems, some pre- and post-processing of the excavated soil is required when using LTTD. In particular, excavated soils are first screened to remove large cuttings (e.g., cuttings that are greater than 2 inches in diameter). These cuttings may be sized (i.e., crushed or shredded) and then introduced back into a feed material. After leaving the desorber, soils are cooled, re-moistened, and stabilized (as necessary) to prepare them for disposal/reuse.

U.S. Pat. No. 5,127,343 (the '343 patent) discloses one prior art apparatus for the low-temperature thermal desorption of hydrocarbons. FIG. 1 from the '343 patent reveals that the apparatus consists of three main parts: a soil treating vessel, a bank of heaters, and a vacuum and gas discharge system. The soil treating vessel is a rectangularly shaped receptacle. The bottom wall of the soil treating vessel has a plurality of vacuum chambers, and each vacuum chamber has an elongated vacuum tube positioned inside. The vacuum tube is surrounded by pea gravel, which traps dirt particles and prevents them from entering a vacuum pump attached to the vacuum tube.

The bank of heaters has a plurality of downwardly directed infrared heaters, which are closely spaced to thoroughly heat the entire surface of soil when the heaters are on. The apparatus functions by heating the soil both radiantly and convectionly, and a vacuum is then pulled through tubes at a point furthest away from the heaters. This vacuum both draws the convection heat (formed by the excitation of the molecules from the infrared radiation) throughout the soil and reduces the vapor pressure within the treatment chamber. Lowering the vapor pressure decreases the boiling point of the hydrocarbons, causing the hydrocarbons to volatize at much lower temperatures than normal. The vacuum then removes the vapors and exhausts them through an exhaust stack, which may include a condenser or a catalytic converter.

In light of the needs to maximize heat transfer to a contaminated substrate using temperatures below combustion temperatures, U.S. Pat. No. 6,399,851 discloses a thermal phase separation unit that heats a contaminated substrate to a temperature effective to volatize contaminants in the contaminated substrate but below combustion temperatures. As shown in FIGS. 3 and 5 of U.S. Pat. No. 6,399,851, the thermal phase separation unit includes a suspended air-tight extraction, or processing, chamber having two troughs arranged in a "kidney-shaped" configuration and equipped with rotating augers that move the substrate through the extraction chamber as the substrate is indirectly heated by a means for heating the extraction chamber.

In addition to the applications described above, those of ordinary skill in the art will appreciate that recovery of adsorbed hydrocarbons is an important application for a number of industries. For example, a hammermill process is often used to recover hydrocarbons from a solid.

One recurring problem, however, is that the recovered hydrocarbons, whether they are received by either of the methods described above or whether by another method, can become degraded, either through the recovery process itself, or by the further use of the recovered hydrocarbons. This degradation may result in pungent odors, decreased performance, discoloration, and/or other factors which will be appreciated by those having ordinary skill in the art.

Accordingly, there exists a continuing need for systems and methods for treating recovered hydrocarbons to reduce odor and discoloration and improve performance.

SUMMARY OF INVENTION

In one aspect, embodiments disclosed herein relate to a system for treating recovered fluids in-line that includes a thermal reactor for separating contaminated drill cuttings into drill cuttings and contaminants by applying heat to the contaminated drill cuttings so as to vaporize contaminants from the contaminated drill cuttings; a first condenser in fluid connection with the thermal reactor for condensing the vaporized contaminants; a separator in fluid connection with the first condenser for separating the condensed vapors into an oleaginous liquid and an aqueous liquid, wherein at least a portion of one of the aqueous liquid and oleaginous liquid is fed back into the first condenser via a feedback line; and an ozone generator operatively coupled to the feedback line, wherein at least the portion of the fed back liquid is ozonated by the ozone generator and fed into the condenser.

In another aspect, embodiments disclosed herein relate to a system for treating recovered fluids in-line that includes a thermal reactor for separating contaminated drill cuttings into drill cuttings and contaminants by applying heat to the contaminated drill cuttings so as to vaporize contaminants from the contaminated drill cuttings; a first condenser in fluid connection with the thermal reactor for condensing first vaporized contaminants into a first condensed liquid, wherein at least a portion of the condensed liquid is fed back into the first condenser via a first feedback line; a second condenser in fluid connection with the first condenser for condensing second vaporized contaminants into a second condensed liquid; a first separator in fluid connection with the second condenser for separating the second condensed liquid into a second oleaginous liquid and a second aqueous liquid, wherein at least a portion of at least one of the oleaginous liquid and the aqueous liquid is fed back into the second condenser via a second feedback line; and an ozone generator operatively coupled to at least one selected from the first and second feedback line, wherein at least one of the fed back liquids is ozonated by the ozone generator.

In yet another aspect, embodiments disclosed herein relate to a method of treating recovered fluids in-line that includes separating contaminated drill cuttings into drill cuttings and contaminants by applying heat to the contaminated drill cuttings so as to vaporize contaminants from the contaminated drill cuttings; condensing at least a portion of the vaporized contaminants in a first condenser; separating the condensed vapors into a first oleaginous liquid and a first aqueous liquid, wherein at least a portion of one of the first oleaginous liquid and first aqueous liquid is fed back into the first condenser via a first feedback line; and injecting ozone into at least the portion of the fed back liquid until an optimal weight ozone per gram liquid of the at least the portion of the fed back liquid is reached.

In yet another aspect, embodiments disclosed herein relate to a method of treating recovered fluids in-line that includes separating contaminated drill cuttings into drill cuttings and contaminants by applying heat to the contaminated drill cuttings so as to vaporize contaminants from the contaminated drill cuttings; condensing at least a portion of the vaporized contaminants in a first condenser, wherein at least a portion of the condensed portion of the vaporized contaminants is fed back into the first condenser via a first feedback line; condensing at least a portion of the remaining vaporized contaminants in a second condenser; separating the remaining portion of the condensed vapors into a first oleaginous liquid and a first aqueous liquid, wherein at least a portion of one of the first oleaginous liquid and first aqueous liquid is fed back into the second condenser via a second feedback line; and injecting ozone into at least the portion of on of the fed back liquids until an optimal weight ozone per gram liquid of the at least the portion of the fed back liquid is reached.

Other aspects and advantages of embodiments disclosed herein will be apparent from the following description and the appended claims.

DETAILED DESCRIPTION

In one or more aspects, embodiments disclosed herein relate to systems and methods for treating recovered fluids, such as hydrocarbons and/or water. In particular, embodiments disclosed herein relate to systems and methods for treating hydrocarbons and/or water that have been recovered from solid materials with ozone.

When fluids are separated from drilling solids, by for example, a thermal phase separation (TPS) system, high temperatures used to drive the separation process cause thermal cracking and degradation of the oil and other drilling fluid components separated with the oil phase. The TPS system is configured to separate water and non-aqueous fluid from solid materials, e.g., drill cuttings. The separation process also creates chemical species that may give the oil and/or water an unpleasant odor and discolor the oil, which may negatively affect the marketability of the end product.

As noted above, a number of prior art methodologies for recovering adsorbed hydrocarbons from "cuttings" (i.e., rock removed from an earth formation) are currently used by hydrocarbon producers. While embodiments disclosed herein are not limited to this industry, the embodiments described below discuss the process in that context, for ease of explanation. In general, embodiments disclosed herein may be applied to any "cracked" hydrocarbon fluid or aqueous fluid. A "cracked" hydrocarbon fluid is one where at least some of the "higher" alkanes present in a fluid have been converted into "smaller" alkanes and alkenes.

A typical prior art process for hydrocarbon recovery, as described above, involves indirectly heating a material having absorbed materials thereon causing the hydrocarbons and/or aqueous fluids to volatilize. The volatized hydrocarbon and aqueous vapors are then extracted, cooled, condensed, and separated. As a result of the heating process, even at low temperatures, a portion of the recovered hydrocarbon and/or aqueous fluid may be degraded and/or contaminated. As used herein, the term degraded simply means that at least one property of the hydrocarbon fluid is worse than a "pure" sample. For example, a degraded fluid may be discolored, may have a depressed flashpoint, may have a pungent odor, or may have increased viscosity. "Recovered" hydrocarbons, as used herein, relate to hydrocarbons which have been volatized off of a solid substrate and condensed through any known method. As used herein, recovered hydrocarbons may also be referred to as a "TPS-separated oil" or an "oil." Similarly, "recovered" aqueous fluids refer to aqueous fluids that similarly been volatized off of a solid substrate and condensed through any known method.

The present inventors have analyzed diesel oil that has undergone thermal cracking and have identified dimethyl disulfide, isobutyraldehyde, and toluene as possible contributors to certain degraded properties of the hydrocarbon fluid. These chemicals are typically not present in compositions of drilling fluids and may evolve from organoclays, drilling fluid additives, or contaminants from a drilled formation.

Ozone

In embodiments disclosed herein, a cracked hydrocarbon fluid and/or aqueous fluid is contacted with a stream of ozone. Ozone is known as an oxidizing agent, and previous studies have shown that ozone does not react with saturated compounds such as alkanes and saturated fatty acids. It is also known that ozone will react with unsaturated compounds such as alkenes, unsaturated fatty acids, unsaturated esters and unsaturated surfactants. The present inventors have discovered that by passing ozone through cracked hydrocarbons, improved hydrocarbon fluids may result. In particular, the present inventors have discovered that a reduction in odor and an improved coloration may occur. Reducing odor is of significant concern because of the increased regulation of pollution in hydrocarbon production. U.S. Patent Publication No. 2005/0247599, which is assigned to the present assignee and herein incorporated by reference in its entirety, discloses a system and method for treating a hydrocarbon fluid to reduce the pungent odors and discoloration of the hydrocarbon and increase performance. The method includes heating contaminated material to volatilize the contaminants and contacting the volatilized contaminants with an effective amount of ozone.

Embodiments of the present disclosure involve contacting a hydrocarbon fluid with an effective amount of ozone. An "effective amount," as used herein, refers to an amount sufficient to improve a desired property (such as odor or color) in a hydrocarbon fluid. One of ordinary skill in the art would appreciate that the effective amount is a function of the concentration of the contaminants and the volume of the fluids to be treated. Further, the effective amount of ozone may also be a function of time.

Without being bound to any particular mechanism, the present inventors believe that the methods disclosed herein operate through a chemical reaction known as ozonolysis. The reaction mechanism for a typical ozonolysis reaction involving an alkene is shown below:

Thus, in the reaction, an ozone molecule ($O_3$) reacts with a carbon-carbon double bond to form an intermediate product known as ozonide. Hydrolysis of the ozonide results in the formation of carbonyl products (e.g., aldehydes and ketones). It is important to note that ozonide is an unstable, explosive compound and, therefore, care should be taken to avoid the accumulation of large deposits of ozonide.

Overtreatment of recovered fluids with ozone may result in oil having rancid or acidic properties due to an abundance of carboxylic acids, and may also result in the formation of a residue. Recovered fluids undertreated with ozone may still exhibit degraded properties as discussed above. Therefore, optimization of the ozone treatment process of recovered fluids is needed. Optimization of ozone dosage for the treatment of recovered fluids is discussed in more detail below.

The efficacy of ozone as an agent to improve at least one property of a hydrocarbon fluid was investigated. In this embodiment, recovered hydrocarbons were used. One suitable source for the recovered hydrocarbons is described in U.S. patent application Ser. No. 10/412,720 (Publication No. 2004/0204308), which is assigned to the assignee of the present invention. That application is incorporated by reference in its entirety.

Another suitable source of recovered hydrocarbons is described in U.S. Pat. No. 6,658,757, which is assigned to the assignee of the present disclosure. That patent is incorporated by reference in its entirety. These two methods of obtaining recovered hydrocarbons are merely examples, and the scope of the present invention is not intended to be limited by the source of the fluid to be treated.

System and Method for Treating Recovered Fluids

Figure 1:
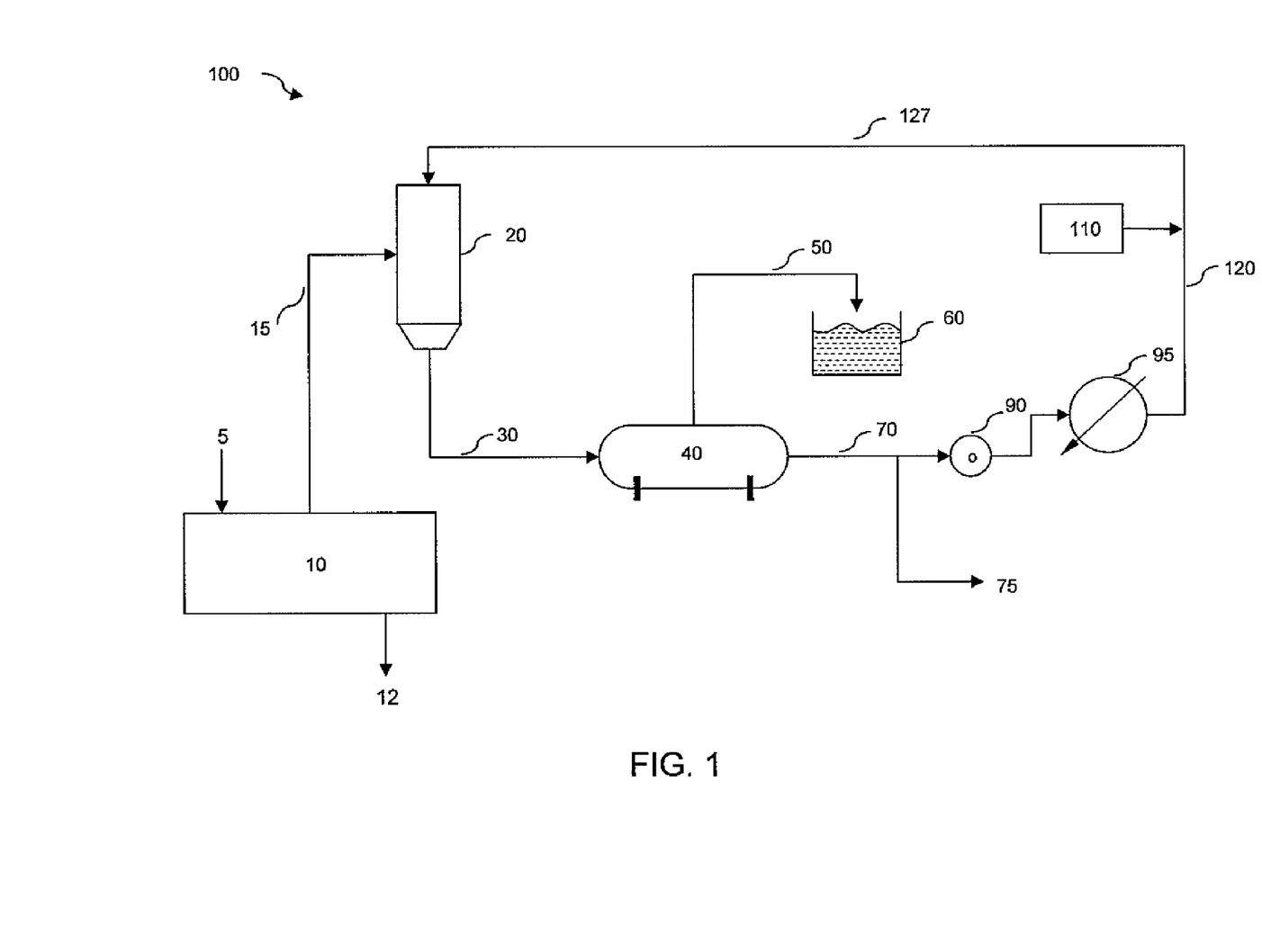
FIG. 1 shows a process diagram of a system for treating recovered hydrocarbons with ozone in accordance with an embodiment disclosed herein.

FIG. 1 shows a system 100 for treating recovered fluids with ozone in accordance with an embodiment disclosed herein. In the embodiment shown, the system 100 provides in-line treatment of recovered hydrocarbons. As used herein, "in-line" refers to a system or process that is performed without significantly interrupting main operations for recovering oil from contaminated drill cuttings. In other words, systems for treating recovered hydrocarbons in accordance with embodiments disclosed herein may simply be added in the form of a feedback loop without intervening between operational units conventionally used in oil recovery.

In the embodiment shown, system 100 includes a heating chamber 10 which may volatilize hydrocarbons from the surface of drill cuttings 5 by applying heat to the drill cuttings 5. In one embodiment, prior to being fed to the heating chamber 10, the drill cuttings 5 may first be optionally screened to remove large cuttings (e.g., cuttings that are greater than 2 inches in diameter). For instance, drill cuttings arising from the drilling process may be subjected to a screening device (not shown), e.g., shakers. Further, the drill cuttings 5 may also pass through a pressurized vessel (not shown) to facilitate loading into the heating chamber 10. One of ordinary skill in the art will appreciate that the drill cuttings 5 may be subjected to any pre-treatment known in the art.

A heating chamber 10 according to embodiments disclosed herein may include any type of thermal reactor or indirectly heated thermal desorption oil recovery equipment known in the art, including, for example, a Thermal Phase Separator (TPS). The heating chamber 10 may apply heat, by radiation, convection, friction, and/or combinations thereof, to the drill cuttings 5. In one embodiment, the heating chamber 10 may generate heat by rotating rotor arms inside. The generation of heat may cause vaporization of at least a portion of the contaminants adsorbed to the surface of the drill cuttings 5.

Upon completion of vaporization, the vaporized contaminants 15 are evacuated from the heating chamber 10, and are fed into a condensation system 20. Any particulate matter 12 that is present in the remaining contaminants is discharged from the heating chamber 10. Any particulate matter separated from the vaporized contaminants 15 may be conveyed to a solids recovery (not shown).

In the embodiment shown, the condensation system 20 is provided to allow for the condensation of vaporized contaminants 15. By way of condensation, the phase of the vaporized contaminants 15 is changed to liquid form, which may contain an oleaginous and/or aqueous component. Subsequently, condensed vapors 30, i.e., the liquids containing the oleaginous and/or aqueous components, are transferred to an oil/water separator 40. The oil/water separator 40 is configured to separate the condensed vapors 30 into an oleaginous liquid phase and an aqueous liquid phase.

In one embodiment, recovered oil 50 is directed to a recovered oil tank 60 for collection. In some embodiments, recovered oil may be re-circulated into the condensation system 20. Meanwhile, a portion of the recovered water is fed back 70 through a feedback conduit 120 to the condensation system 20, and an amount of the recovered water is transferred 75 for reuse, disposal, or further treatment.

In one embodiment, a pump 90 is provided to pump the recovered water 70 from the water/oil separator 40 through the feedback conduit 120. The recovered water 70 may be transferred to a heat exchanger 95 prior to re-circulation into the condensation system 20. In accordance with embodiments disclosed herein, an ozone generator 110 is operatively coupled to the feedback conduit 120 at a selected point between the oil/water separator 40 and the condensation system 20.

In the embodiment shown, the ozone generator 110 is configured to generate and inject ozone into the feedback flow of the recovered water 70. As described above, an ozone molecule ($O_3$) reacts with a carbon-carbon double bond to form an intermediate product known as ozonide. The flow rate of ozone and the rate of the feedback flow of the recovered water 70 are controlled by the ozone generator 110 and the water pump 90 such that a pre-determined level of ozone content in the recovered water 70 is reached.

The ozone generator 110 generates a flow of ozone that enters the feedback conduit 120. In some embodiments, the ozone generator 110 is configured to provide a selected amount of ozone (selected in, for example, grams/hour) to the recovered water 70 within the feedback conduit 120, such that the resultant treated water contains a pre-determined weight ozone per gram water for a specified reaction time. In one embodiment, for example, the ozone generator 110 may provide up to 14 grams of ozone per kilogram of hydrocarbon vapors in conduit 15 to the feedback conduit 120. For proper operation, the ozone generator 110 may be assisted by any known devices in the art such as an air compressor and a water tank, as described referring to FIG. 2.

In the embodiment shown, ozone-containing recovered water 127 further flows through the feedback conduit 120 to the condensation system 20. In some embodiments, a valve (not shown) may be used to control the rate of flow. The ozone-containing recovered water 127 is then mixed with the desorbed vapor 15 and fluids containing condensed vapors 30 in the condensation system 20 to contribute to removal of odors generated primarily from degraded hydrocarbons. Mixture of the ozone-containing recovered water 127 may be achieved, for example, by spraying in a counter current direction to the desorbed vapors 15, which may allow for improved contact time, surface area, and mass and heat transfer with the vapors 15 and ozone-containing recovered water 127.

Figure 2:
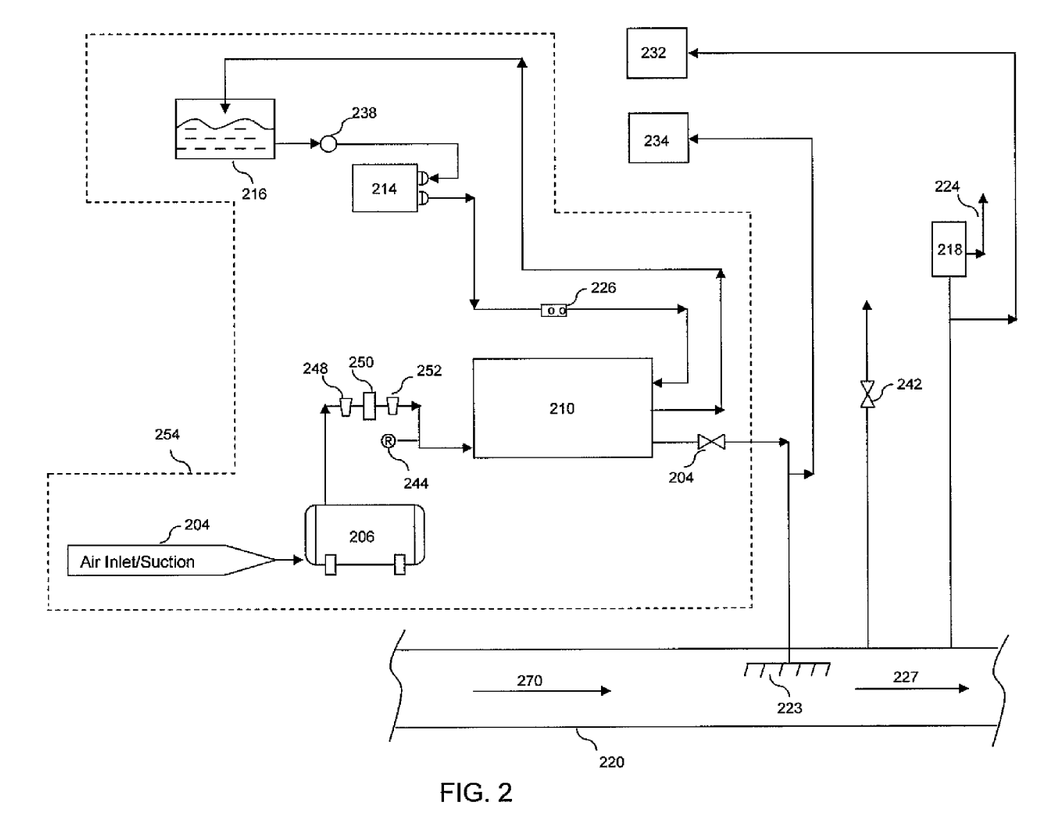
FIG. 2 illustrates one embodiment of an ozone assembly operatively connected to a feedback conduit in accordance with embodiments disclosed herein.

FIG. 2 illustrates one embodiment of an ozone assembly 254 operatively connected to a feedback conduit 220 in accordance with embodiments disclosed herein. The ozone assembly 254 includes an ozone generator 210 and an air compressor 206 configured to take air through an inlet 204 and transfer compressed air to the ozone generator 210. The ozone generator 210 is configured to receive the compressed air from the air compressor 206 and water from a water tank 216.

Any ozone generator known in the art may be used, such that the ozone generator supplies a pre-determined flow and concentration of ozone to the feedback conduit 220. Commercial ozone generators are available from a variety of vendors, for example, Model LG-7 ozone generator by Ozone Engineering, Inc. (El Sobrante, Calif.). However, one of ordinary skill in the art would appreciate that a particular ozone generator may be selected based on the size of the system and volume of recovered oil to be treated. A plurality of filters, for example, a coalescent filter 248 and particle filter 252, and an air dryer 250 may be operatively coupled between the air compressor 206 and ozone generator 210 to remove or reduce any contaminants or moisture in the compressed air. In one embodiment, a pressure regulator 244 may be operatively connected to an air flow line from the air compressor 206 to regulate the pressure of the compressed air entering the ozone generator 210.

In one embodiment, the ozone assembly 254 may further include a chiller 214 configured to receive and cool water pumped 238 from the water tank 216. Cooled water may then be transferred to the ozone generator 210. The water transferred to the ozone generator 210 may be circulated back to the water tank 216 and recycled through the chiller 214 and ozone generator 210, thereby forming a cooling loop. In some embodiments, a flow meter 226 may be operatively coupled between the chiller 214 and ozone generator 210 to measure the flow rate of water to the ozone generator 210. In addition, a one-way valve 242 may be operatively coupled to the ozone generator 210 to control the flow rate of ozone to the feedback conduit 220. In one embodiment, an ozone monitor 234 may be operatively coupled between the ozone generator 210 and feedback conduit 220 to monitor the amount of ozone transferred to the feedback conduit 220. One of ordinary skill in the art will appreciate that any ozone monitor may be used, for example, a Model 454-M ozone process monitor, provided by API, Inc. (San Diego, Calif.).

In the embodiment shown, the ozone generator 210 injects ozone through an aeration device 223 to the feedback conduit 220. By such injection of ozone, at least a portion of recovered water 270 that flows through the feedback conduit 220 may entrain ozone, thereby being ozonated. In one embodiment, the aeration device 223 may be disposed in the feedback conduit 220 such that it injects or sparges ozone into the recovered water 270. In one embodiment, the aeration device 223 may comprise a septum or membrane having small perforations through which ozone is sparged. The membrane may be flexible, such as a woven or non-woven fabric, or a sheet of rubber or other elastomer with perforated openings cast or otherwise formed there-through. Alternatively, the membrane may be rigid, for example, a solid frit, which is a body of sintered particles with fine openings between particles, or a metal surface with fine perforations, or openings devised by any means known in the art. One of ordinary skill in the art will appreciate, however, that the membrane may be constructed of any of a number of materials known in the art that resist deterioration in fluids containing ozone and formed such that ozone may be sparged through the membrane and into the fluids. Additionally, one of ordinary skill in the art will appreciate that any other device for injecting ozone into a conduit may be used without departing from the scope of embodiments disclosed herein. Further, while only one ozone generator and aeration device are shown in FIG. 2, one of ordinary skill in the art will appreciate that multiple ozone generators and aeration devices may be installed along the feedback conduit 220 for sufficient ozonation.

Ozone treated recovered water 227 is then transferred through the feedback conduit 220 to a tank where the ozone treated recovered water is needed for odor removal. One of ordinary skill in the art will appreciate that the ozone treated recovered water can be directed towards any vessel tank, or barrel. A valve (not shown) may be used to control the rate of flow of the water.

The feedback conduit 220 may further include a one way valve 242 configured to vent gases out of the conduit 220. Additionally, an ozone destruction unit 218 may be operatively coupled to the feedback conduit 220 to remove excess ozone from the conduit 220, safely convert the ozone back into oxygen, and then vent 224 the safe gases to the atmosphere. In one embodiment, the ozone destruction unit 218 may include a cylinder packed with MgO pellets. MgO acts as a catalyst to convert ozone back into oxygen, and is not consumed by contact with ozone or air. However, one of ordinary skill in the art would appreciate that other types of ozone destruction units may be used, such as a high temperature oxidizer, which may be effective at destroying ozone. In some embodiments, an ozone monitor 232 may be operatively coupled between the feedback conduit 220 and ozone destruction unit 218 to monitor the amount of ozone transferred. One of ordinary skill in the art will appreciate that any ozone monitor may be used, for example, a Model 454-M ozone process monitor, provided by API, Inc. (San Diego, Calif.).

Figure 3:
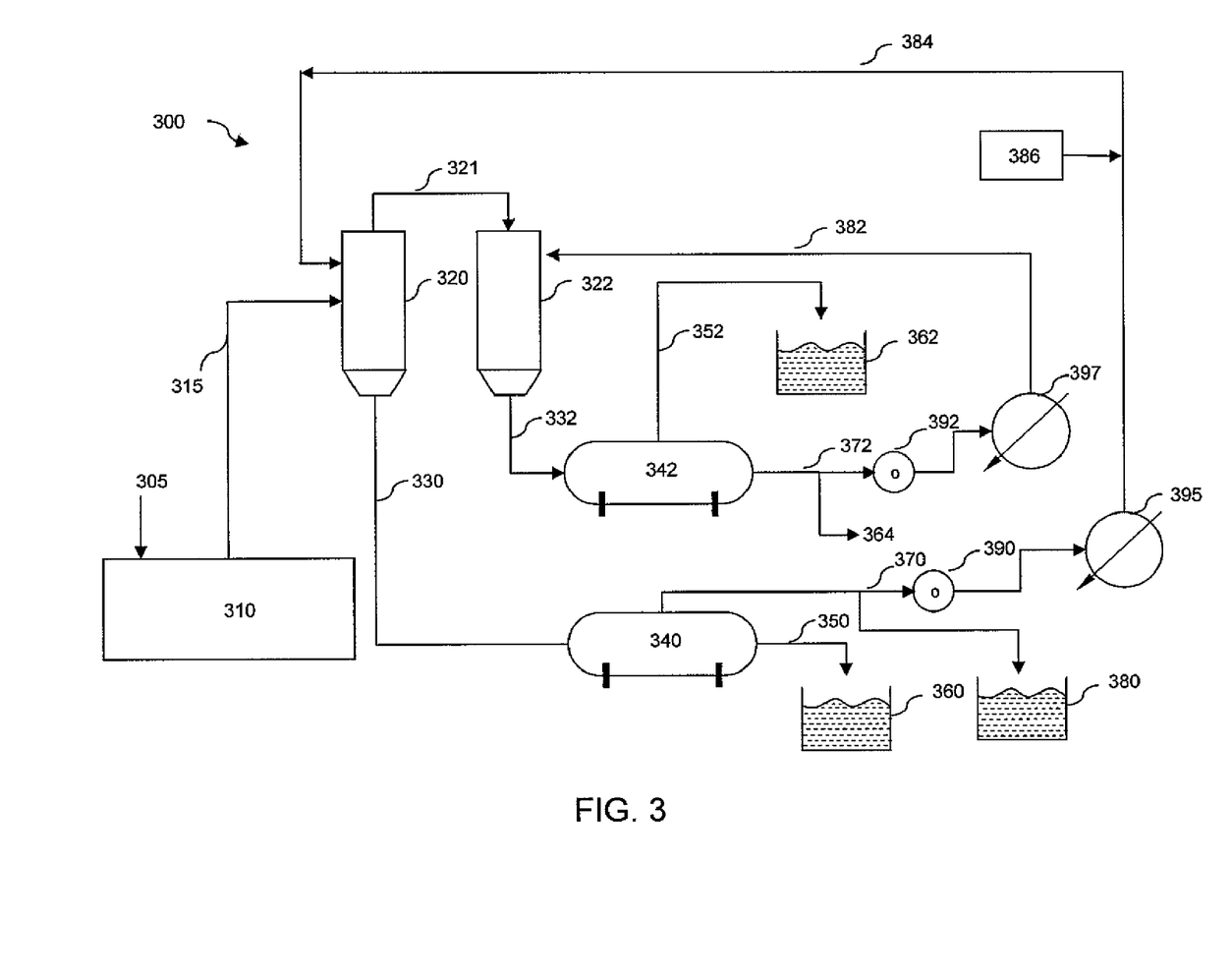
FIG. 3 illustrates a system for treating recovered hydrocarbons with ozone in accordance with another embodiment disclosed herein.

FIG. 3 illustrates a system 300 for treating recovered fluids with ozone in accordance with another embodiment disclosed herein. In the embodiment shown, the system 300 also provides in-line treatment of recovered hydrocarbons. Contaminated drill cuttings 305 arising from a drilling process are loaded into a heating chamber 310. Heat generated by convection, radiation, friction, and/or combinations thereof vaporizes at least a portion of the contaminants adsorbed to the surface of the drill cuttings.

In the embodiment shown, vaporized contaminants (i.e., desorbed vapors 315) are evacuated from the heating chamber 310 and then passed through an oil condenser 320 to allow for the condensation of at least a portion of the oil vapors and separation from the remaining desorbed vapors 321. The desorbed vapors 321 are then fed to a water condenser 322. The water condenser 322 allows for the condensation of at least a portion of the water vapors and separation from non-condensable gases.

As shown, condensed vapors in both the oil condenser 320 and water condenser 322 may contain an oleaginous component (e.g., oil) and an aqueous component (e.g., water) being mixed with each other. For separation of these two kinds of liquid, the condensed vapors in the oil condenser 320 and water condenser 322 are transferred 330, 332 to a first separator 340 and second separator 342, respectively. In one embodiment, the first separator 340 performs separation of the transferred condensed vapors into oil and water. Similarly, the second separator 342 also performs separation of the transferred condensed vapors into oil and water. The separated oil and water may be directed for collection at oil recoveries 380, 362 and water recoveries 360, 364. In some embodiments, a portion of the recovered oil and water may be re-circulated 370, 372 through a first and second feedback conduit 384, 382 into the oil condenser 320 and the water condenser 322, respectively. Optionally, the re-circulated oil 370 and water 372 may be transferred to a heat exchanger 395, 397 prior to re-circulation into the oil and water condensers 320, 322. In one embodiment, pumps 390, 392 are provided to pump the re-circulated oil 370 and water 372 through the feedback conduits 384, 382, respectively. In accordance with embodiments disclosed herein, an ozone generator 386, is operatively coupled to at least one of the feedback conduits 384, 382. While the ozone generator 386 is shown to be coupled only to the feedback conduit 384 in FIG. 3, one of ordinary skill in the art will appreciate that either the ozone generator 386 or another ozone generator may be coupled to the feedback conduit 382.

In one embodiment, the ozone generator 386 may be equivalent to the ozone generators 110, 210 as described with reference to FIGS. 1 and 2. The flow rate of ozone and the rate of the feedback flow of the recovered oil 370 are controlled by the ozone generator 386 and the pump 390 such that the pre-determined level of ozone content in the recovered oil 370 is reached. One of ordinary skill in the art will appreciate that the flow rate of ozone for ozonating the recovered oil 370 may be selected based on a variety of factors, for example, the flow rate of the recovered oil 370 in the feedback conduit 420 or the amount of degraded hydrocarbons in the recovered oil 370, and does not limit the scope of embodiments described herein.

In further detail, the flow rate of ozone and the rate of the feedback flow of the recovered oil 370 are determined based on the desired reaction time of ozone (i.e., the length of time that the recovered oil is subjected to ozone) that results in optimal weight ozone per gram oil. In one embodiment, for example, the ozone generator 386 may provide up to 14 grams of ozone per kilogram of hydrocarbon vapors in conduit 315 to the feedback conduit 384.

In another embodiment, the desired weight ozone per gram oil is between 4,000 and 14,000 ppm $O_3$ per gram of oil. In another embodiment, the weight ozone per gram oil is between 6,000 and 10,000 ppm $O_3$ per gram of oil. In yet another embodiment, the weight ozone per gram oil is between 6,000 and 8,000 ppm $O_3$ per gram of oil. However, one of ordinary skill in the art would appreciate that an effective amount of ozone may depend on the particular sample of recovered hydrocarbons to be treated. Further, while the above mentioned amounts of ozone may be sufficient to ozonate the recovered hydrocarbons, it may be desirable to reduce the amount of ozone introduced to the flow lines to reduce and/or prevent over treatment of the recovered hydrocarbons, which may, for example, result in the formation of a residue. In particular, the inventors of the present disclosure have also recognized that the formation of a residue substance in equipment, etc., may be used to monitor the amount and/or flow rate of ozone introduced in the systems of the present disclosure. That is, upon detection of the residue, such as by visual detection or other automated means known in the art, the concentration of the ozone may be reduced and/or the flow rate of the ozone may be increased to reduce the formation of residue and thus avoid overtreatment.

For example, in one embodiment, for a sample of 500 mL of recovered oil sparged with ozone from an ozone generator having a gas feed of 1.625 L/min, 1.3 psig inlet pressure, and 100% ozone concentration at ambient pressure, the desired reaction time is between 30 minutes and 60 minutes. In another embodiment, the reaction time is between 40 and 50 minutes. In yet another embodiment, the reaction time is approximately 45 minutes. As shown in the example below, these reaction time ranges result in a weight ozone per gram oil range of 6,000 to 14,000 ppm $O_3$ per gram of oil.

In some embodiments, one or more temperature gauges (not shown) may be operatively connected to the feedback conduits 384, 382 to determine the temperature inside the conduits. Additionally, one or more pressure gauges (not shown) may be operatively coupled to the feedback conduits 384, 382 to determine the pressure inside. In one embodiment, the pressure inside the feedback conduit 384 may be controlled as known in the art. Thus, in one embodiment, the reaction time may be adjusted based on the temperature and pressure inside the feedback conduit 384.

By way of ozonation, ozone treated recovered oil further flows through the feedback conduit 384 to the oil condenser 320. In some embodiments, a valve (not shown) may be used to control the rate of flow. The ozone treated recovered oil is then be mixed with condensed vapors in the oil condenser 320 to contribute to removal of odors generated primarily from degraded hydrocarbons.

Figure 4:
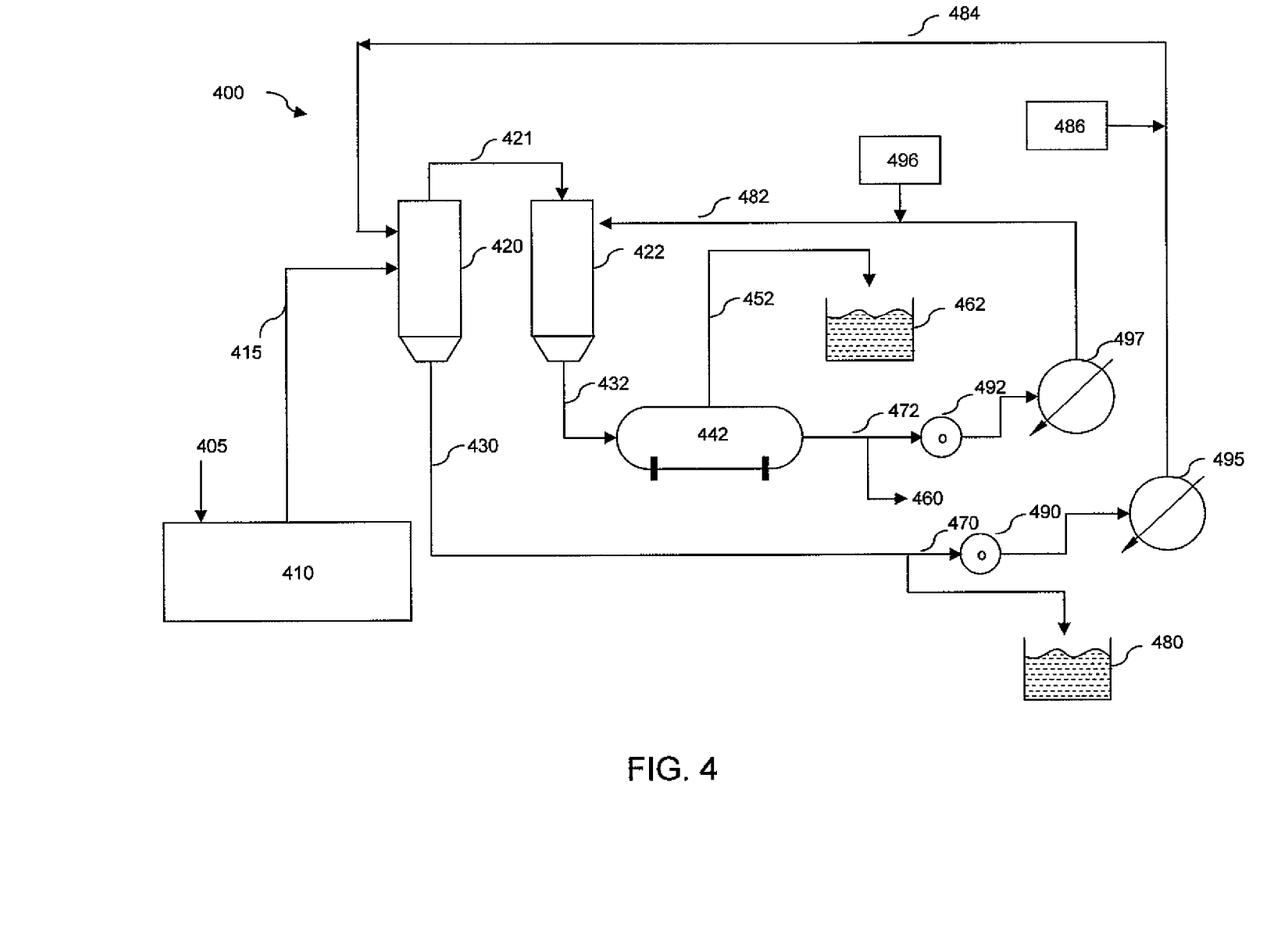
FIG. 4 illustrates a system for treating recovered hydrocarbons with ozone in accordance with another embodiment disclosed herein.

Referring to FIG. 4, FIG. 4 illustrates another system 400 for treating recovered fluids with ozone in accordance with another embodiment disclosed herein. In the embodiment shown, the system 400 also provides in-line treatment of recovered hydrocarbons. Contaminated drill cuttings 405 arising from a drilling process are loaded into a heating chamber 410. Heat generated by convection, radiation, friction, and/or combinations thereof vaporizes at least a portion of the contaminants adsorbed to the surface of the drill cuttings.

In the embodiment shown, vaporized contaminants (i.e., desorbed vapors 415) are evacuated from the heating chamber 410 and then passed through an oil condenser 420 to allow for the condensation of at least a portion of the oil vapors and separation from the remaining desorbed vapors 421. The desorbed vapors 421 are then fed to a water condenser 422. The water condenser 422 allows for the condensation of water vapors and separation from non-condensable gases.

As shown, condensed vapors in oil condenser 420 only contain an oleaginous component. One of ordinary skill in the art would appreciate that by keeping the temperature of oil condenser 420 at a sufficiently low temperature, only oil may be condensed in oil condenser 420. Condensed oil vapors in oil condenser 420 may be transferred 430 for oil recovery 480.

As also shown, condensed vapors in water condenser 422 may contain an oleaginous component (e.g., oil) and an aqueous component (e.g., water) being mixed with each other, For separation of these two kinds of liquid, the condensed vapors in water condenser 422 are transferred 432 to an oil/water separator 442, respectively. In one embodiment, separator 442 performs separation of the transferred condensed vapors into oil and water. The separated oil and water may be directed for collection at oil recovery 462 and water recovery 460.

In some embodiments, a portion of the recovered oil 480 and water 460 may be re-circulated 470, 472 through a first and second feedback conduit 484, 482 into the oil condenser 420 and the water condenser 422, respectively. Optionally, the re-circulated oil 470 and water 472 may be transferred to a heat exchanger 495, 497 prior to re-circulation into the oil and water condensers 420, 422. In one embodiment, pumps 490, 492 are provided to pump the re-circulated oil 470 and water 472 through the feedback conduits 484, 482, respectively. In accordance with embodiments disclosed herein, ozone generators 486, 496, are operatively coupled to the feedback conduits 484, 482, respectively. While the ozone generators 486, 496 are shown to be coupled to both the feedback conduits 484, 482 in FIG. 4, one of ordinary skill in the art will appreciate that ozone generator 486 or ozone generator 496 may be coupled to either feedback conduit 484 or feedback conduit 482 in alternative embodiments.

In one embodiment, ozone generators 486, 496 may be equivalent to the ozone generators 110, 210 as described with reference to FIGS. 1 and 2. The flow rate of ozone and the rate of the feedback flow of the re-circulated oil 470 and re-circulated water 472 are controlled by the ozone generators 486, 496 and pumps 490, 492 such that the pre-determined level of ozone content in the re-circulated oil 470 and/or re-circulated water 472 is reached. One of ordinary skill in the art will appreciate that the flow rate of ozone for ozonating the re-circulated oil 470 and re-circulated water 472 may be selected based on a variety of factors, for example, the flow rate of the re-circulated oil 470 and/or re-circulated water 472 in the feedback conduits 484, 482 or the amount of degraded hydrocarbons in the re-circulated oil 470 and re-circulated water 472, and does not limit the scope of embodiments described herein.

In further detail, the flow rate of ozone and the rate of the feedback flow of the re-circulated oil 470 and re-circulated water 472 are determined based on the desired reaction time of ozone (i.e., the length of time that the recovered oil is subjected to ozone) that results in optimal weight ozone per gram oil. In one embodiment, for example, the ozone generators 486 may provide up to 14 grams of ozone per kilogram of hydrocarbon vapors in conduit 415 to the feedback conduits 484. Either or both generators 486, 496 may be used, but in a particular embodiment, the overall concentration of ozone generated may be up to 14 grams of ozone per kilogram of hydrocarbon vapors in conduit 415 into the feedback conduits 484.

In one embodiment, the desired weight ozone per gram oil is between 6,000 and 14,000 ppm $O_3$ per gram of oil liquid. In another embodiment, the weight ozone per gram oil is between 10,000 and 13,000 ppm $O_3$ per gram of oil. In yet another embodiment, the weight ozone per gram oil is between 13,000 and 14,000 ppm $O_3$ per gram of oil. Further, when treating the fed-back aqueous fluids, the desired weight ozone per gram of aqueous fluid may range between 1,000 and 4,000 ppm $O_3$ per gram of aqueous liquid, between 1,500 and 3,000 ppm $O_3$ per gram of aqueous liquid in another embodiment, and about 2,000 ppm $O_3$ per gram of aqueous liquid in yet another embodiment.

For example, in one embodiment, for a sample of 500 mL of recovered oil sparged with ozone from an ozone generator having a gas feed of 1.625 L/min, 1.3 psig inlet pressure, and 100% ozone concentration at ambient pressure, the desired reaction time is between 20 minutes and 60 minutes. In another embodiment, the reaction time is between 40 and 50 minutes. In yet another embodiment, the reaction time is approximately 45 minutes. As shown in the example below, these reaction time ranges result in a weight ozone per gram oil range of 4,000 to 14,000 ppm $O_3$ per gram of oil.

In some embodiments, one or more temperature gauges (not shown) may be operatively connected to the feedback conduits 484, 482 to determine the temperature inside the conduits. Additionally, one or more pressure gauges (not shown) may be operatively coupled to the feedback conduits 484, 482 to determine the pressure inside. In one embodiment, the pressure inside the feedback conduit 484 may be controlled as known in the art. Thus, in one embodiment, the reaction time may be adjusted based on the temperature and pressure inside the feedback conduit 484.

By way of ozonation, ozone-containing recovered oil further flows through the feedback conduit 484 to the oil condenser 420. In some embodiments, a valve (not shown) may be used to control the rate of flow. The ozone-containing recovered oil is then be mixed with condensed vapors in the oil condenser 420 to contribute to removal of odors generated primarily from degraded hydrocarbons.

Also by way of ozonation, ozone-containing recovered water further flows through the feedback conduit 482 to the oil condenser 422. In some embodiments, a valve (not shown) may be used to control the rate of flow. The ozone-containing recovered water is then be mixed with condensed vapors in the water condenser 422 to contribute to removal of odors generated primarily from degraded hydrocarbons.

EXAMPLES

Ozone has been shown, for example, in U.S. Publication No. 2005/0247599, to be an effective eliminator of cracked oil odors. In previous studies, low dosages such as 3 g/day, 8 g/day, and 12 g/day of ozone were applied over a period of several days. In contrast, in certain embodiments disclosed below, up to 7 g/hr of ozone was applied to recovered hydrocarbons for a period up to 4 hours.

Example 1

In order to establish appropriate flow rates of oxygen into an ozone generator, a 500 ml sample of recovered hydrocarbon was placed in a cylinder. Ozone was bubbled through the cylinder at a rate of 7 g/hr. Commercial ozone generators are available from a variety of vendors. For this particular embodiment, a Model LG-7 ozone generator sold by Ozone Engineering, Inc. (El Sobrante, Calif.), capable of producing up to 7 g/hr ozone at 0-100% concentration at 0-10 L/min at 0-10 psig, was used to treat recovered hydrocarbons.

The top of the cylinder remained open to the air, in order to avoid a build up of ozonide. However, a vacuum blower could also be used to continuously purge the ozonide. In this embodiment, the untreated sample of recovered hydrocarbons was deep brown in color, almost black, and opaque. Pungent sulfur-like and charred odors were present. The specific gravity (SG) of the recovered hydrocarbons was measured to be 0.84 g/ml. After approximately 45 minutes of ozone treatment at a variable concentrations and flow rates, the recovered hydrocarbon became noticeably lighter in color, a tea-colored shade of brown. A small amount of highly viscous residue was collected on the walls of the cylinder near the surface of the recovered hydrocarbons. The odor was reduced, but still contained traces of a burnt or charred odor. It was discovered that by contacting the ozone with the recovered hydrocarbons for 4 hours at variable concentrations and flow rates, the recovered hydrocarbons was substantially transparent, faint yellow, and devoid of sulfur odors. However, a rancid, acidic odor was detected. Additionally, a heavy layer, approximately 0.5 inches in depth, of viscous residue, orange-brown in color, had collected on the walls and bottom of the cylinder.

From this experimental set up, it was determined that a flow rate of 1.625 L/min of oxygen feed to the ozone generator with an oxygen inlet pressure of 1.3 psig, and an ozone monitor pressure of 1.2 psig was desired for the system as described in this example.

Example 2

Using the experimental equipment set up and determined flow rates and pressures of Example 1, a series of tests was performed to determine an optimal reaction time of ozone and recovered hydrocarbons to reduce odors without overtreatment and with minimal accumulation of heavy residue. In this example, gas flow rate, inlet pressure, and ozone concentration were held constant, and the time period of reaction were varied. The reaction times tested were 30 minutes, 60 minutes, and 90 minutes. For each test, a new untreated 500 ml sample of recovered hydrocarbons was used.

The results of the ozone treated samples are summarized in Table 1 below. Each ozone treated sample resulted in some residue accumulation that was easily removed from the test cylinder and weighed.

TABLE 1

Ozone Treated Recovered Hydrocarbons Results

| Reaction time | Appearance | Odor | Wt. Residue, g | Total $O_3$ added, g | Total ppm $O_3$ per g sample | SG oil, g/ml |
|---|---|---|---|---|---|---|
| 30 minutes | Medium brown | Charred, but low | 1.27 | 2.71 | 6460 | 0.8095 |
| 60 minutes | Orange brown | Paraffinic | 1.39 | 5.82 | 13866 | 0.8315 |
| 90 minutes | Orange yellow | Acidic, pungent | 3.10 | 9.12 | 21716 | 0.8355 |

The four samples, including a control, untreated oil sample, were analyzed on a gas chromatograph/mass spectrometer (CG/MS) to determine concentration of paraffins, iso-paraffins, aromatics, napthenics, olefins, aldehydes, ketones, and acids (the latter three collectively called "other compounds"), collectively referred to as "PIONA." The concentration of benzene, toluene, ethylbenzene, and xylene, collectively referred to as "BTEX" were also determined. The color and flash points of the recovered hydrocarbons were also determined after each test, in accordance with ASTM D-1500 and D-93, respectively. In addition, the concentration of hydrocarbons in each sample was determined. The results are summarized in Table 2 below.

TABLE 2

CG/MS Data for Untreated and Ozone Treated Recovered Hydrocarbons

| Property | Untreated oil | 30 min. | 60 min. | 90 min. |
|---|---|---|---|---|
| PIONA tests: | | | | |
| Total paraffins, wt % | 23.93 | 23.22 | 26.05 | 23.38 |
| Total isoparaffins, wt % | 36.24 | 36.53 | 37.45 | 34.55 |
| Total aromatics, wt % | 11.24 | 11.21 | 11.24 | 8.69 |
| Total naphthenics, wt % | 18.43 | 19.08 | 17.19 | 18.33 |
| Total olefins, wt % | 6.25 | 5.52 | 3.66 | 5.88 |
| Other*, wt % | 3.91 | 4.44 | 4.41 | 9.17 |
| BTEX tests: | | | | |
| Benzene, ppm | 0.001 | 0.001 | 0.001 | <0.001 |
| Toluene, ppm | 0.006 | 0.005 | 0.006 | 0.005 |
| Ethylbenzene, ppm | 0.005 | 0.005 | 0.005 | 0.005 |
| Xylene, ppm | 0.018 | 0.034 | 0.041 | 0.037 |
| Total BTEX | 0.030 | 0.045 | 0.053 | 0.047 |
| Color, ASTM D-1500 | 7.5 | 4.5 | 3.5 | 2.0 |
| Hydrocarbons by gc/ms | | | | |
| C4 to C8, % conc. | 0.17 | 0.14 | 0.23 | 0.28 |
| C9 to C13, % conc. | 21.91 | 24.08 | 23.35 | 23.16 |
| C14 to C18, % conc. | 47.65 | 46.94 | 46.48 | 46.18 |
| C19 to C23, % conc. | 23.98 | 22.84 | 23.47 | 23.57 |
| C24 to C28, % conc. | 5.17 | 4.97 | 5.30 | 5.46 |
| C29 to C33, % conc. | 0.85 | 0.79 | 0.90 | 1.01 |
| C34 to C44, % conc. | 0.28 | 0.23 | 0.27 | 0.33 |
| C45 to C49, % conc. | not detected | not detected | not detected | not detected |
| Flash Point, ASTM D-93 | 190 F. | 190 F. | 193 F. | 192 F. |

Depletion of olefins and the accumulation of species in the "others" category is consistent with the reaction of ozone at the reactive double-bond site on an olefin molecule, and with the increase in odors and with an acidic character over ozone treatment time.

Example 3

The recovered hydrocarbons (TPS-separated oil) treated for 30 and 60 minutes were used as base oils to build two conventional oil-based mud samples of 350 mL each to determine the behavior of the treated recovered hydrocarbons during their end use, e.g., as a base oil in building drilling fluids. The mud included a mud weight of 10 lb/gallon, an oil-water ratio (OWR) of 80/20, and a brine phase of 25% weight $CaCl_2$. In addition, a sample was built using untreated recovered hydrocarbons (untreated TPS-separated oil) and another sample using No. 2 Diesel. The rheology of the samples was determined using a FANN-35 Viscometer, and the results are summarized in Table 3 below.

TABLE 3

Rheology of Mud Samples

| Mud built with base oil: | Diesel | 30 min | 60 min | TPS Oil |
|---|---|---|---|---|
| Retort Analysis @ 1200 F. | | | | |
| MIs Water | 5.30 | 5.40 | 5.30 | 5.50 |
| MIs Oil | 12.70 | 12.70 | 12.70 | 12.80 |
| MIs Solids | 2.00 | 1.90 | 2.00 | 1.70 |
| | vol % | vol % | vol % | vol % |
| % Water | 26.50 | 27.00 | 26.50 | 27.50 |
| % Oil | 63.50 | 63.50 | 63.50 | 64.00 |
| % Solids | 10.00 | 9.50 | 10.00 | 8.50 |
| O/W Ratio | 70.6/29.4 | 70.2/29.8 | 70.6/29.4 | 69.9/30.1 |
| SG at 70 F. | 1.23 | 1.18 | 1.20 | 1.22 |
| Density, lb/gal | 10.21 | 9.83 | 9.98 | 10.14 |
| Rheology @ 150 F. | | | | |
| 600 rpm | 103 | 65 | 54 | 79 |
| 300 rpm | 66 | 39 | 32 | 51 |
| 200 rpm | 49 | 29 | 23 | 41 |
| 100 rpm | 34 | 18 | 15 | 30 |
| 6 rpm | 18 | 6 | 5 | 15 |
| 3 rpm | 16 | 5 | 5 | 14 |
| PV, cP | 37 | 26 | 22 | 28 |
| VP, lb/100 ft2 | 29 | 13 | 10 | 23 |
| 10 s gel | 18 | 8 | 7 | 18 |
| 10 min gel | 23 | 14 | 11 | 26 |
| ES @ 120 F. (volts) | 470 | 113 | 84 | 245 |
| POM, ml | 0.55 | 0.20 | 0.20 | 0.40 |
| Chlorides, mg/L | 60500 | 56500 | 58000 | 57500 |
| % HG Solids | 8.45 | 7.38 | 7.22 | 9.94 |
| % LG Solids | −0.87 | −0.10 | 0.48 | −3.71 |
| Corrected % HGS | 7.58 | 7.28 | 7.22 | 6.23 |
| Corrected % LGS | 0.00 | 0.00 | 0.48 | 0.00 |

As shown in Table 3, the rheological properties of muds built with the TPS-separated oil, treated and untreated, are lower than those of the mud built with diesel. Reduction in plastic viscosity may be attributed to the viscosity of the base oil. The samples treated with ozone showed a reduction in yield point and gel strength, as compared to the diesel sample. This reduction in the yield point may be attributed to the formation of acidic material, e.g., carboxylic acids, during ozone treatment. Acidic material may cause dispersion and deflocculation of clay particles by neutralizing the cations on the surface of the clays so that the particles repel one another. This in turn reduces yield point and gel strengths. The presence of acidic material is further indicated by a lower $P_{OM}$ value in the muds built with ozone treated oil. Low $P_{OM}$ are often followed by weakening emulsions, and the electrical stability values of the two muds built with ozone treated oil are both lower, indicating a loss of stability in the brine-in-oil emulsion. Thus, higher dosages of alkaline material, emulsifiers, and viscosifiers may be used in the formulation to counteract the effects of residual acids.

Example 4

Processed oil from a hammermill reactor, such as that described in U.S. Pat. No. 6,658,757, or a thermal reactor, such as that described in U.S. Patent Publication No. 2004/0204308, was pumped into a 30 liter reaction chamber, where it was contacted with ozone introduced by a diffuser. The oil and dispersed gas flow upward until reaching a weir, over which oil spills and cascades into a separate chamber, losing the dispersed gas in the process. The oil flow by gravity into a collection chamber. The treatments and results are shown below in Table 4.

TABLE 4

| Sample | Treatment | Results |
|---|---|---|
| 1 | Condensed Oil from a hammermill process was processed through the reaction chamber at a rate of 7 L/hr with ozone injected in at 80% or 96 g/hr of ozone in air (16134 ppm ozone in oil by weight). A total of 21.5 L were processed. | The charred odor from the condensed oil was removed by it was replaced by a sharp rancid acidic odor, indicating overtreatment. The oil was lightened to a lighter shade of yellow. During the first 60 minutes of the treatment, a temperature rise from 78° F. to 110° F. was noted, with stabilization at 100° F. Concentration of ozone in the offgas ranged from 1.4 to 7 g/m³. A small amount of residue, about 20 mL in volume, was collected from the reaction chamber at the end of the process. |
| 2 | Oil from an oil/water separation from a hammermill process was processed at 10 L/hr with ozone injected at 50% of 70 g/hr of ozone (8235 ppm ozone in oil by weight). A total of 15 L were processed. | Color was slightly reduced from a pale yellow shade, odor was removed, and no acidic odor was noted, suggesting little or no overtreatment during the test. A temperature rise of 78° F. to 100° F. over the first 50 minutes with stabilization at 100° F. was noted. Offgas ozone concentration ranged from 0.1 to 0.6 g/m³. About 20 mL in volume, was collected from the reaction chamber at the end of the process. |
| 3 | Condensed Oil from a hammermill process was processed through the reaction chamber at a rate of 14 L/hr with ozone injected in at 60% or | Odor was removed, and no acidic odor was noted, suggesting little or no overtreatment during the test. Color was slightly reduced from the original yellow shade. A temperature rise of 78° F. to 90° F. over the first 62 minutes with stabilization at 90° F. |

TABLE 4-continued

| Sample | Treatment | Results |
|---|---|---|
|  | 84.6 g/hr of ozone in air (7194 ppm ozone in oil by weight). A total of 17 L were processed. | was noted. Offgas ozone concentration ranged from 0.2 to 0.9 g/m$^3$. About 20 mL in volume, was collected from the reaction chamber at the end of the process. |
| 4 | Recovered Oil from a thermal reactor process was processed through the reaction chamber at a rate of 10 L/hr with ozone injected in at 70% or 90 g/hr of ozone in air (10588 ppm ozone in oil by weight). A total of 15 L were processed. | The oil became lighter in color, and a minor odor remained. A temperature rise of 78° F. to 98° F. over the first 50 minutes with stabilization at 98° F. was noted. Offgas ozone concentration was consistently around 0.6 g/m$^3$. About 20 mL in volume, was collected from the reaction chamber at the end of the process |
| 5 | A control experiment sparged air without ozone for 3 days on condensed oil from Sample 3. | There was no reduction of odor or color without ozone, and no residue was formed. No changes in temperatures and pressures were observed. |

Example 5

Field Trial

Oily solids were treated in a hammermill, in which liquids are evaporated from the mineral solids and transferred out of the process chamber. After removal of entrained solids by a cyclone, the vaporized liquids are recondensed and directed to an oil/water separator (OWS) which allows the aqueous and hydrocarbon fractions to partition into separate layers. The water and oil fractions exit the OWS as separate streams. Samples from streams exiting the OWS were treated with ozone in a reactor chamber such as the one described in Example 4. The first test lasted 24 hours, and involved treatment of the oil stream that exited the OWS. After 24 hours, the oil flow rate into the reaction chamber was increased for the second test. The third test involved the treatment of the water recovered from the OWS, which possessed a significant odor similar to that of recovered oil. The results of the tests are shown below in Table 5.

TABLE 5

| Test | Duration hrs | Total L Processed | Avg g/hr O$_3$ | Max g/hr O$_3$ | Avg wt % O$_3$ | Max wt % O$_3$ | L/hr oil | Avg ppm O$_3$ in oil | Avg vessel ° F. | Max ° F. |
|---|---|---|---|---|---|---|---|---|---|---|
| 1 | 24 | 240 | 56.4 | 75 | 2.43 | 3.10 | 10 | 6635 | 100.5 | 111 |
| 2 | 20 | 280 | 51 | 56 | 2.10 | 2.32 | 14 | 4286 | 87.4 | 100 |
| 3 | 6 | 84 | 40.6 | 46 | 1.63 | 1.90 | 14 | 2900 | 89.5 | 91 |

During the first test, accumulation of a viscous residue was observed within the oxidation reaction chamber and on the surface of objections within the chamber, including the ozone sparge inlet. However, during the second test, when the increased oil flow rate resulted in lower vessel temperatures, the residue accumulation was significantly lower.

Advantageously, embodiments disclosed herein may provide a system and method for treating recovered hydrocarbons and/or aqueous fluids with ozone. In particular, embodiments disclosed herein may provide a system and method for reducing odors in recovered hydrocarbons and aqueous fluids caused by high temperature and thermal cracking. Additionally, embodiments disclosed herein may provide an in-line treatment system and method for treating recovered hydrocarbons and/or aqueous fluids without interrupting main operations for recovering oil from drill cuttings.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A system for treating recovered fluids in-line, comprising:
a thermal reactor for separating contaminated drill cuttings into drill cuttings and contaminants by applying heat to the contaminated drill cuttings so as to vaporize contaminants from the contaminated drill cuttings;
a first condenser in fluid connection with the thermal reactor for condensing the vaporized contaminants;
a separator in fluid connection with the first condenser for separating the condensed vapors into an oleaginous liquid and an aqueous liquid, wherein at least a portion of one of the aqueous liquid and oleaginous liquid is fed back into the first condenser via a feedback line; and
an ozone generator operatively coupled to the feedback line, wherein at least the portion of the fed back liquid is ozonated by the ozone generator and fed into the condenser.

2. The system of claim 1, wherein an air compressor is fluidly coupled to the ozone generator.

3. The system of claim 2, further comprising a chiller operatively coupled to the ozone generator and a water tank.

4. The system of claim 1, further comprising an ozone destruction unit operatively coupled to the feedback line.

5. The system of claim 1, further comprising at least one ozone monitor operatively coupled to at least one of the ozone generator and the feedback line.

6. The system of claim 1, further comprising an aeration device operatively coupled to the ozone generator so as to sparge ozone in the feedback line.

7. A system for treating recovered fluids in-line, comprising:
a thermal reactor for separating contaminated drill cuttings into drill cuttings and contaminants by applying heat to the contaminated drill cuttings so as to vaporize contaminants from the contaminated drill cuttings;
a first condenser in fluid connection with the thermal reactor for condensing first vaporized contaminants into a first condensed liquid, wherein at least a portion of the condensed liquid is fed back into the first condenser via a first feedback line;

a second condenser in fluid connection with the first condenser for condensing second vaporized contaminants into a second condensed liquid;

a first separator in fluid connection with the second condenser for separating the second condensed liquid into a second oleaginous liquid and a second aqueous liquid, wherein at least a portion of at least one of the oleaginous liquid and the aqueous liquid is fed back into the second condenser via a second feedback line; and an ozone generator operatively coupled to at least one selected from the first and second feedback line, wherein at least one of the fed back liquids is ozonated by the ozone generator.

8. The system of claim 7, further comprising:
a second separator in fluid connection with the first condenser for separating the first condensed liquid into a first oleaginous liquid and a first aqueous liquid, wherein at least a portion of the first oleaginous liquid is fed back into the first condenser via a first feedback line.

9. The system of claim 7, wherein an air compressor is fluidly coupled to the ozone generator.

10. The system of claim 7, further comprising an ozone destruction unit operatively coupled to at least one of the first and second feedback lines.

11. The system of claim 7, further comprising an aeration device operatively coupled to the ozone generator so as to sparge ozone in at least one of the first and second feedback lines.

* * * * *